Nov. 17, 1970 H. H. KOBRYNER 3,541,397

CIRCUIT LIMITED PLUG-IN PANEL BOARDS WITH GEOMETRICALLY CODED APERTURE DISCRIMINATION MEANS

Original Filed Feb. 5, 1968 2 Sheets-Sheet 1

INVENTOR.
H.H. KOBRYNER

BY Hopgood & Calimafde
ATTORNEYS

INVENTOR.
H. H. KOBRYNER
BY
Hopgood & Calimafde
ATTORNEYS

United States Patent Office 3,541,397

Patented Nov. 17, 1970

3,541,397

CIRCUIT LIMITED PLUG-IN PANEL BOARDS WITH GEOMETRICALLY CODED APERTURE DISCRIMINATION MEANS

Herman H. Kobryner, Forest Hills, N.Y., assignor, by mesne assignments, to Murray Manufacturing Corporation, Hartford, Conn., a corporation of Connecticut Continuation of application Ser. No. 702,992, Feb. 5, 1968. This application Nov. 17, 1969, Ser. No. 871,645

Int. Cl. H02b *1/04*

U.S. Cl. 317—119 3 Claims

ABSTRACT OF THE DISCLOSURE

A device for limiting the number of circuits that can be connected to an electrical distribution panel board is described. The side wall of the panel board which supports one end of the circuit protectors attached thereto contains coded apertures for the reception of correspondingly coded feet extending from the circuit protectors. The circuit protectors are provided with configurations of feet coded according to the number of circuits they service. The coded apertures in the side wall of the mounting pan are arranged to control the number of circuits which may be attached to the panel board.

This application is a continuation of my prior copending application Ser. No. 702,992 filed Feb. 5, 1968 and now abandoned.

BACKGROUND

The invention relates to circuit limitation upon panel boards for electrical load distribution centers. More particularly, the invention provides a unique arrangement which prevents overloading of such centers by the insertion of protector elements which accept more than the desired number of circuits, yet still permits the use of such elements with varying circuit servicing capacity, and optional circuit distribution.

The overloading of electrical distribution centers by the attaching of more circuits than the centers were constructed to service is a perpetual problem. Such overloading is made possible by the use of fusible or circuit-breaker elements which take up less room upon the load panel, or can carry more current, than those elements for which it was designed, so that more current can be demanded from a given panel board than it has the cooling capacity to accommodate.

As a result of such procedures, it is not unusual to find a load center that is so overloaded to to create a fire hazard. To prevent such overloading, a plan has been adapted which requires that positive limitation be placed upon the maximum number of circuits that can be attached to a given panel board.

It is, therefore, an objective of this invention to further this plan by providing a load center to which no more than a specified number of circuits can be attached.

A problem with prior art devices that have attempted to impose similar limitations on load panels is that the physical restrictions either upon the panel or the components limited a particular position on the bus bar to the installation of a single type of component. For example, restricting lugs on the mounting pan were broken off which permitted the installation of a component capable of servicing a circuit of fixed current capacity.

It is, therefore, a further objective of the invention to permit the use of a maximum variety of circuits within the stated limitations.

A further inherent problem in any attempt to limit the circuits attachable to a load panel by physical means is the alteration of the limiting features by those who would seek to subvert it.

It is, therefore, a further objective of the invention to provide a means for limiting the maximum number of circuits that can be attached to a given load panel, which means is resistant to modification resulting in subversion of its objective.

SUMMARY

Briefly, the invention comprises an electrical distribution panel board and circuit protector components therefor, each having coded feet which fit correspondingly coded apertures in the side wall of the mounting pan of the panel board. The number and shape of the feet attached to a component are determined by the number of circuits which may be connected to the component, while the correspondingly coded apertures determine the number and location of the components which may be plugged into the panel board.

According to the circuit limitation concept, the power supplied to a household distribution panel determines the number of circuits which can be connected thereto.

Once the power available for distribution is known, the number of circuits which can be connected to the distribution panel can be determined as follows.

The amperage available is divided by an assumed average circuit amperage; for example, 10 amps. If three wire power is supplied, this number is multiplied by two. For instance, if 120 amps is supplied by a three wire power cable, the number of circuits which can be connected to its distribution panel will be 24.

With the number of circuits thus determined, the theory of the invention may be employed to construct a suitable distribution panel. The number and arrangement of apertures in the side wall of the mounting pan can then be selected by choosing apertures that will accommodate protector components which service no more than the maximum number of circuits in accordance with the above formula.

The invention provides flexibility by permitting interchangeability of components where each supplies the same or less than the maximum number of circuits for which a particular station on the panel board is reserved. Such controlled interchange of components aids in placing an effective limit upon the number of circuits which can be connected to the bus bar.

The aforementioned interchangeability of components is accomplished by providing the components servicing a fewer number of circuits with coded feet that will fit apertures in the side wall of the mounting pan designed for coded feet of components servicing a greater number of circuits. However, the reverse is not true; the coded feet of components servicing a higher number of circuits will not fit into apertures designed for components servicing a lower number of circuits.

Other objectives, advantages, and various further features of novelty and invention will be pointed out or will occur to those skilled in the art from a reading of the following specification in conjunction with the accompanying drawings.

DESCRIPTION OF PREFERRED EMBODIMENT

Figure 1:
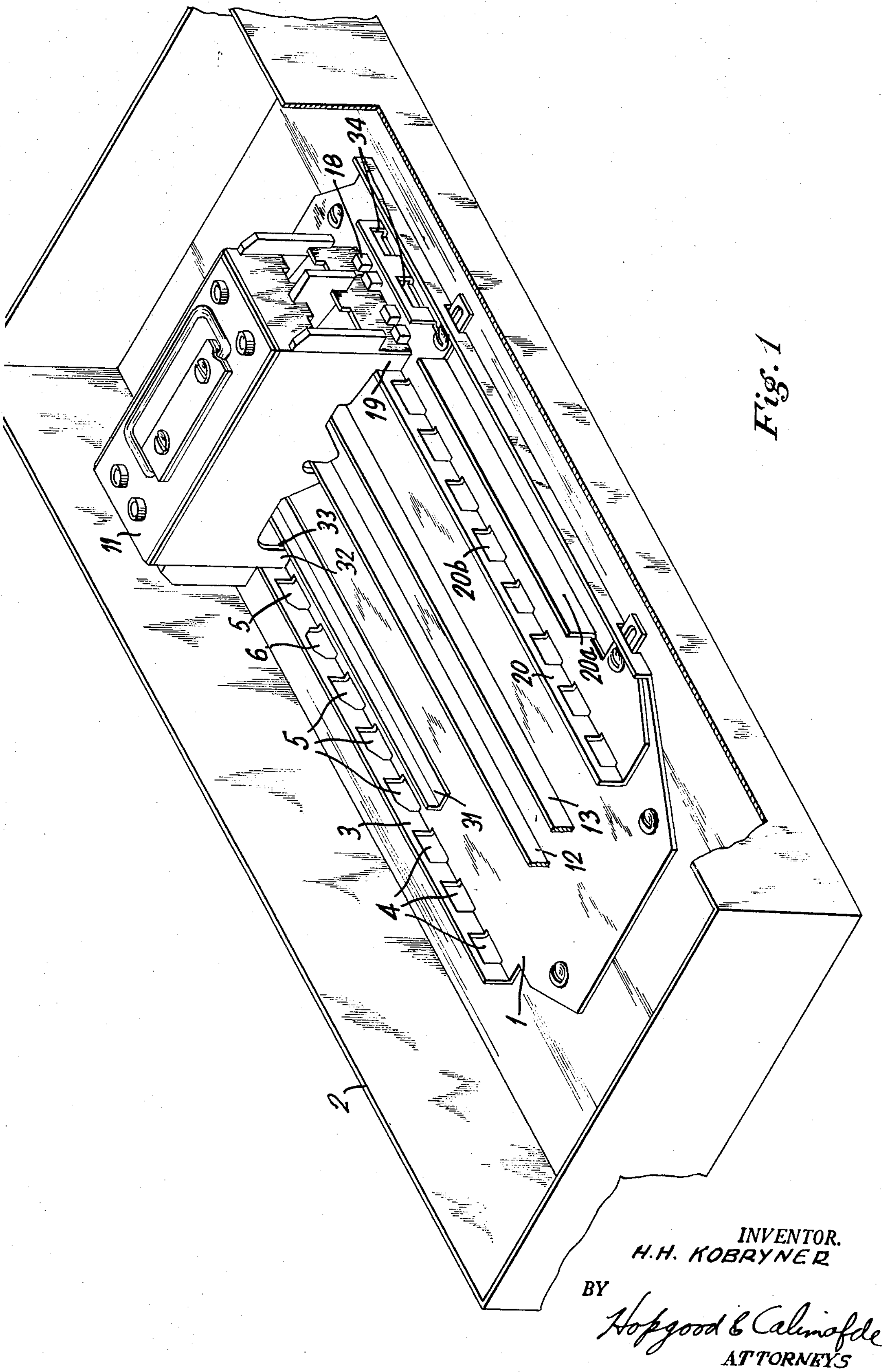
FIG. 1 is a cut-away perspective view of a load center showing a mounting pan constructed according to the invention.
Figure 2:
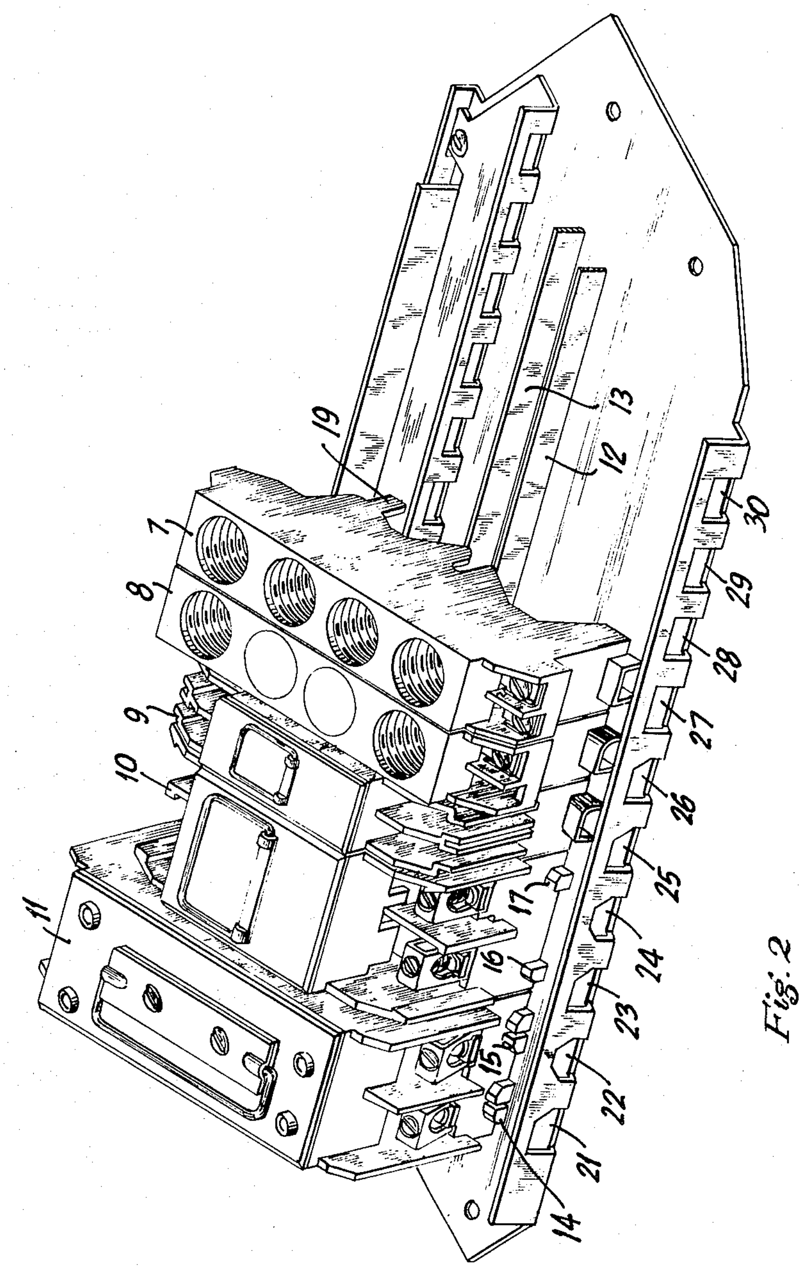
FIG. 2 is a perspective view of a mounting pan constructed according to the invention with corresponding plug-in fusible components in the process of being inserted.

Referring now to FIG. 1, the mounting pan 1 of the invention is seen attached to enclosure 2 of the distribution center. The side wall 3 of the mounting pan contains three types of coded apertures. Coded aperture 4 is rectangular and designates a position on the mounting pan and bus-bar assembly to which a four-circuit component 7 (FIG. 2) may be attached. Aperture 5 is an opening in the side wall of the pan, essentially rectangular but with one upper corner of the rectangle closed. Aperture 5 designates a position reserved for two-circuit components 8 and 9 (FIG. 2). Aperture 6 is similar to aperture 5 except that both upper corners of the rectangle are closed. Aperture 6 is reserved for components which provide a single position on the bus-bar for each circuit, such as components 10 and 11(FIG. 2).

The components designed for use with the mounting pan illustrated in FIG 1 are shown in FIG. 2 and include:

(a) 100 amp two-circuit pull-out components 11
(b) 60 amp two-circuit pull-out components 10
(c) two circuit 30 amp pull-out components 9
(d) two-circuit plug fuse components 8 (fusible to 30 amps per leg) and
(e) four-circuit plug fuse components 7 (fusible to 60 amps per leg).

The 100 amp component 11 occupies two positions on the bus-bars 12 and 13. The 100 amp component therefore has two coded feet 14, 15. The 60 amp pull-out 10 also occupies two positions on the bus-bar and has two coded feet projections 16 and 17. Upon inspection, it is apparent that either the 60 or 100 amp pull-outs may be inserted where any two adjacent apertures are available. However, because of its size and heat generating capacity the 100 amp pull-out is generally limited to the top position on the bus-bar. This is accomplished by providing lugs 18 upon leg 19 of the component opposite the end at which the coded feet are located. Lugs 18 prevent the insertion of leg 19 of component 11, in the space between the face of sliding locking bar and its associated baffle **20*a***.

Two-circuit components 8 and 9 may be placed in any position opposite apertures 4 or 5, but four-circuit components 7 may only be placed in positions opposite apertures 4.

to the acceptance of components servicing only two circuits; but that these two circuits can be varied between ratings of 10 and 100 amps.

Apertures 23 and 24 form the same combination as 21 and 22 and can accept the same fusible components, servicing a maximum of two circuits, except for the 100 amp component 11 which as mentioned above is limited in this embodiment to the position controlled by apertures 21 and 22.

Apertures 25 and 26 can each accept two-circuit components 8 or 9, for a maximum of four circuits; or can together accept a two-footed element such as a 60 amp pull-out 10 for a lesser total of two circuits.

The remaining apertures 27, 28, 29 and 30 can each accept a four-circuit component, for a maximum total of 16 circuits; or each will accept a two-circuit component 8 or 9 for a total of 8 circuits; or 27, 28, and 29, 30 can be paired to accept two, two-footed components 10 for a total of four circuits.

If components are chosen as indicated to accommodate a maximum number of circuits, the total is as follows:

| Aperture | Component No. | Maximum No. circuits |
|---|---|---|
| 21 and 22 | 8, 9, 10 or 11 | 2 |
| 23 and 24 | 8, 9, 10 or 11 | 2 |
| 25 | 8 or 9 | 2 |
| 26 | 8 or 9 | 2 |
| 27 | 7 | 4 |
| 28 | 7 | 4 |
| 29 | 7 | 4 |
| 30 | 7 | 4 |
| Total | | 24 |

As 24 is the number of circuits permitted by the circuit limitation concept as set forth above, the limiting objective of the invention has been accomplished.

The versatility of the invention is illustrated by the following table which indicates some of the options available in the selection of plug-in components, and how the exercise of these options affect the number of circuits connected to the panel board.

| Aperture | Option A (components) | Circuit | Option B (components) | Circuit | Option *d* (components) | Circuit |
|---|---|---|---|---|---|---|
| 21, 22 | 11 | 2 | 11 | 2 | 10 | 2 |
| 23 | 10 (23, 24) | 2 (23, 24) | 9 | 2 (23, 24) | 10 (23, 24) | 2 (23, 24) |
| 24 | | | (1) | | | |
| 25 | 10 (25, 26) | 2 (25, 26) | 9 | 2 | 10 (25, 26) | 2 (25, 26) |
| 26 | | | 9 | 2 | | |
| 27 | 10 (27, 28) | 2 (27, 28) | 9 | 2 | 7 | 4 |
| 28 | | | 9 | 2 | 7 | 4 |
| 29 | 10 (29, 30) | 2 (29, 30) | 9 | 2 | 7 | 4 |
| 30 | | | 9 | 2 | 7 | 4 |
| Total | | 10 | | 16 | | 22 |

[1] Empty.

As there are no individual single position components, the single circuit apertures 6 represent positions usable only with two-circuit components such as the 60 and 100 amp pull-outs 10 and 11. Apertures 6 must therefore be considered in conjunction with their adjacent apertures when analyzing or designing a load panel.

The mounting pan illustrated in FIGS. 1 and 2 is designed to accommodate fusible components which will service circuits for a 120 amp power supply. The following analysis of the apertures in the mounting pan illustrated in FIGS. 1 and 2 will serve to illustrate the manner in which the concept of the invention is applied.

Starting from the left, aperture 21 is two-circuit position aperture, and by itself can accept either of the illustrated two-circuit components 8 or 9, servicing 10 to 30 amp circuits; or apertures 21 and 22 taken together can accept either of the two-footed components 10 or 11 servicing 60 and 100 amp circuits. It follows then that apertures 21 and 22 alone or in combination are limited Other options are possible and will be apparent to persons skilled in the art; however, in no case can the panel board be equipped with more than 24 fusible circuit interrupters.

To meet the temptation of users to alter the coded feet so as to defeat the limiting features of the invention, the feet of components 7, 8 and 9 may be made of material such that they cannot be altered without substantial destruction of the component. For example, steel feet can be riveted to a rigid plastic component body.

A further safeguard against subversive component switching is provided by angle bar 31 (FIG. 1). Angle bar 31 provides a vertical baffle fixedly installed parallel to the inside face of the mounting pan wall 3 containing the coded apertures. Baffle 31 is placed so close to wall 3 that in order to get the base leg 32 of the component therebetween, to seat the component on the bus bar, the coded feet must fit completely into the adjacent apertures. This feature is provided to prevent users from attempting to wedge a component onto the bus bar at an angle to avoid the restriction of the apertures. For purposes of simplicity, angle bar 31 has been omitted from FIG. 2.

To install a component, its coded feet are aligned with their selected apertures as illustrated in FIG. 2; the feet are then inserted until the inner edge 33 of leg 32 clears angle bar 31. The component may then be swung down to engage the bus bars in the conventional manner. All components have locking lugs (not shown) similar to lugs 18 on component 11, attached to their legs 19 on their ends opposite their coded feet. Legs 19 and lugs 18 on all components other than the 100 amp pull-out, fit inside sliding bar 20. The rectangular apertures 20*b* in bar 20 engage lugs 18 on components 7, 8, 9 and 10 and rectangular apertures 34 engage lugs 18 on component 11 when bar 20 is moved in toward the center of pan 1.

While the principles of the invention have been described in connection with plug-in type fusible components, the invention can be applied to other types of circuit protecting installations as well; for example, the feet/aperture combinations may be coded in accordance with the current capacity of the circuits. This description is thus by way of example only and is not a limitation to the scope of the invention as set forth in the accompanying claims.

I claim:

1. In combination an electrical power distribution center and circuit protection devices for installation therein comprising an electrical distribution panel board including means defining a plurality of mounting locations for circuit protection devices, said defining means comprising a vertical wall attached to the panel board with a plurality of geometrically coded apertures therein at least two of said apertures having different geometric shapes, a plurality of circuit interruption devices having different current ratings and servicing different numbers of circuits, and coded mounting means extending from each of said circuit interruption devices engaging the coded apertures in said vertical wall, said mounting means being coded according to the number and current rating of the circuits serviced by the circuit interrupting device with which associated, said coded apertures in said vertical wall together with said coded mounting means being effective to permit the installation upon said panel board of only those combinations of said plurality of circuit interruption devices which service up to and including a preselected maximum number of circuits of selected average value.

2. The combination of claim 1, wherein the members of the group of said circuit protection devices which service circuits having a current rating of 60 amperes and greater service two such circuits, and occupy two locations upon the panel board, and wherein those circuit protection devices which service circuits having a current rating of up to 30 amperes service from two to four circuits.

3. The combination of claim 2, wherein said circuit interruption devices rest upon vertical legs, and wherein said coded mounting means extend horizontally outwardly from said legs and through the apertures in said vertical wall, and wherein said panel board further includes a vertical baffle means extending parallel to said vertical wall and inside said legs to prevent installation of said circuit protection devices other than at substantially right angles to said vertical wall.

References Cited

UNITED STATES PATENTS 3,146,379 8/1964 Giger -------------- 317—119

LEWIS H. MYERS, Primary Examiner

G. P. TOLIN, Assistant Examiner